(12) United States Patent
McNiff et al.

(10) Patent No.: US 6,785,229 B1
(45) Date of Patent: Aug. 31, 2004

(54) SYSTEM AND METHOD FOR CONTROLLING A TELEPHONY COMMUNICATION SESSION

(75) Inventors: Bradley J. McNiff, Auburn, NH (US); Cedric H. Druce, Basking Ridge, NJ (US); Randall S. Rutherford, Pelham, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/574,246

(22) Filed: May 19, 2000

Related U.S. Application Data

(63) Continuation of application No. 09/492,945, filed on Jan. 27, 2000.

(51) Int. Cl.[7] .................. H04L 12/46; H04L 12/66; H04Q 11/04

(52) U.S. Cl. ............... 370/230; 370/252; 370/352; 370/401

(58) Field of Search ................. 370/230, 235, 370/252, 253, 351, 352, 354, 355, 356, 389, 401; 379/88.17, 93.01, 93.06, 93.07, 93.09, 221.01, 221.02, 221.07; 709/238, 249; 714/704

(56) References Cited

U.S. PATENT DOCUMENTS

| | | | |
|---|---|---|---|
| 4,771,425 A | 9/1988 | Baran et al. | 370/85 |
| 4,819,228 A | 4/1989 | Baran et al. | 370/85 |
| 4,903,261 A | 2/1990 | Baran et al. | 370/94.2 |
| 4,914,650 A * | 4/1990 | Sriram | 370/235 |
| 5,251,206 A | 10/1993 | Calvignac et al. | 370/60.1 |
| 5,347,516 A | 9/1994 | Yoshida | 370/94.1 |
| 5,889,773 A | 3/1999 | Stevenson, III | 370/352 |
| 6,026,086 A * | 2/2000 | Lancelot et al. | 370/353 |
| 6,208,658 B1 * | 3/2001 | Pickett | 370/401 |
| 6,240,086 B1 * | 5/2001 | Morgan et al. | 370/352 |
| 6,304,637 B1 * | 10/2001 | Mirashrafi et al. | 379/88.17 |
| 6,330,316 B1 | 12/2001 | Donak et al. | 379/196 |
| 6,363,065 B1 * | 3/2002 | Thornton et al. | 370/352 |
| 6,452,922 B1 * | 9/2002 | Ho | 370/352 |
| 6,510,219 B1 | 1/2003 | Wellard et al. | 379/221.01 |

* cited by examiner

*Primary Examiner*—Alpus H. Hsu
(74) *Attorney, Agent, or Firm*—Baker Botts L.L.P.

(57) ABSTRACT

A telephony system includes a hybrid switch coupled to a packet network and a TDM network. The switch establishes a communication session using one of these networks and then switches the communication session to the other one of these networks in response to stored metrics, user request, or other criteria.

24 Claims, 3 Drawing Sheets

FIG. 3

| CALL IDENTIFIER | ROUTE TYPE | VOICE ENCODING ALGORITHM | % PACKETS LOST (LAST 10 SECS) | % PACKETS LOST (ENTIRE CALL) | BIT ERROR RATE | ... | RE-ROUTE THRESHOLDS |
|---|---|---|---|---|---|---|---|
| 1001011 | IP | G.729a | %1.2 | %0.9 | NA | ... | %10.0/%7.5/NA |
| 1001012 | IP | G.711 | %13.4 | %6.4 | NA | ... | %10.0/%7.5/NA |
| ... | ... | ... | ... | ... | ... | ... | ... |
| 1001304 | TDM | NA | NA | NA | 5% | ... | NA/NA/10% |
| 1001305 | IP | G.711 | %0.7 | %0.7 | NA | ... | %5.0/%3.0/NA |
| ... | ... | ... | ... | ... | ... | ... | ... |

FIG. 4

| CALLER IDENTIFIER | MINIMUM PACKET NETWORK QUALITY | IMPORTANCE OF COST | ... | AUTOMATIC SWITCHOVERS |
|---|---|---|---|---|
| 214.555.0897 | 10 | 4 | ... | YES |
| 409.555.4252 | 5 | 1 | ... | NO |
| ... | ... | ... | ... | ... |
| 512.555.9168 | 8 | 8 | ... | ASK CALLER |
| 512.555.2772 | 1 | 10 | ... | YES |
| ... | ... | ... | ... | ... |

SYSTEM AND METHOD FOR CONTROLLING A TELEPHONY COMMUNICATION SESSION

RELATED APPLICATIONS

This application is a continuation of U.S. patent application Ser. No. 09/492,945 filed Jan. 27, 2000, entitled System and Method for Controlling a Telephony Communication Session. This application is related to U.S. patent application Ser. No. 09/4,92,423 filed Jan. 27, 2000, entitled Voice Over Internet Protocol Call Fallback for Quality of Service Degradation.

TECHNICAL FIELD OF THE INVENTION

The present invention relates generally to telephony systems and more particularly to a system and method for controlling a telephony communication session.

BACKGROUND OF THE INVENTION

Telephony systems provide connectivity between subscribers for communicating voice, data, video, or image signals. These systems must provide quality real-time connections on demand for a large volume of subscriber calls. A primary goal of telephony systems is to provide high quality voice connections at the least cost to users. This has been accomplished by digitizing and multiplexing multiple connections on a single line. Multiple digitized connections are traditionally transmitted along a single line using time division multiplexing (TDM). TDM provides fixed timeslots for each connection on the line to ensure quality, but the dedicated timeslot results in an inefficient use of bandwidth.

Packet-based communication protocols offer an attractive alternative to TDM networks. For example, voice over Internet protocol (VoIP) techniques support voice services with high compression and shared bandwidth. However, a major roadblock to the widespread acceptance of VoIP is a concern over the quality of connections. IP was designed for the transport of data that can tolerate delays, dropped packets, and the need for retransmissions. Voice connections, however, are necessarily delay-sensitive and cannot tolerate excessive dropped packets or retransmissions.

SUMMARY OF THE INVENTION

In accordance with the present invention, a system and method for controlling a telephony communication session is provided which substantially eliminates or reduces disadvantages and problems associated with previous systems and methods. In a particular embodiment, the present invention satisfies a need for high quality, low cost telephony service using a packet network and a TDM network.

According to one embodiment of the invention, a telephony system includes a first switch coupled to a first telephony device and a second switch coupled to a second telephony device. The first switch and the second switch establish a telephony communication session connecting the first telephony device and the second telephony device on a first path between the first switch and the second switch, wherein the first path communicates information using a first transmission protocol. The first switch and the second switch also switch the communication session from the first path to a second path between the first switch and the second switch, wherein the second path communicates information using a second transmission protocol.

In accordance with another embodiment of the present invention, a method for controlling a telephony communication session establishes a telephony communication session with a remote device on a first network communicating information using a first transmission protocol, and switches the communication session from the first network to a second network communicating information using a second transmission protocol without disrupting the communication session. The method may also monitor a quality metric of the communication session and switch the communication session from the first network to the second network responsive to the quality metric.

The invention provides a number of technical advantages. The system controls a telephony communication session to allow for mid-call adjustments between available networks to provide low cost connections without sacrificing the quality of service. The quality of service of a connection can be guaranteed by switching from low cost, less reliable networks to more reliable networks, such as TDM networks, if the quality of service deteriorates. The system also allows for more effective marketing of IP telephony networks, since the system guarantees a minimum quality of service by allowing degraded connections to switch mid-call to higher quality connections. The system can also reduce the cost of telephone calls, by switching between different telephony networks mid-call in order to find the least cost connection.

Other technical advantages of the present invention will be readily apparent to one skilled in the art from the following figures, description, and claims.

BRIEF DESCRIPTION OF THE DRAWINGS

For a more complete understanding of the present invention and the advantages thereof, reference is now made to the following descriptions, taken in conjunction with the accompanying drawings, in which:

FIG. 3 illustrates an exemplary session information table maintained by the telephony system;

FIG. 4 illustrates an exemplary caller profile table maintained by the telephony system.

DETAILED DESCRIPTION OF THE INVENTION

The preferred embodiments of the present invention and its advantages are best understood by referring now in more detail to FIGS. 1–5 of the drawings, in which like numerals refer to like parts.

Figure 1:
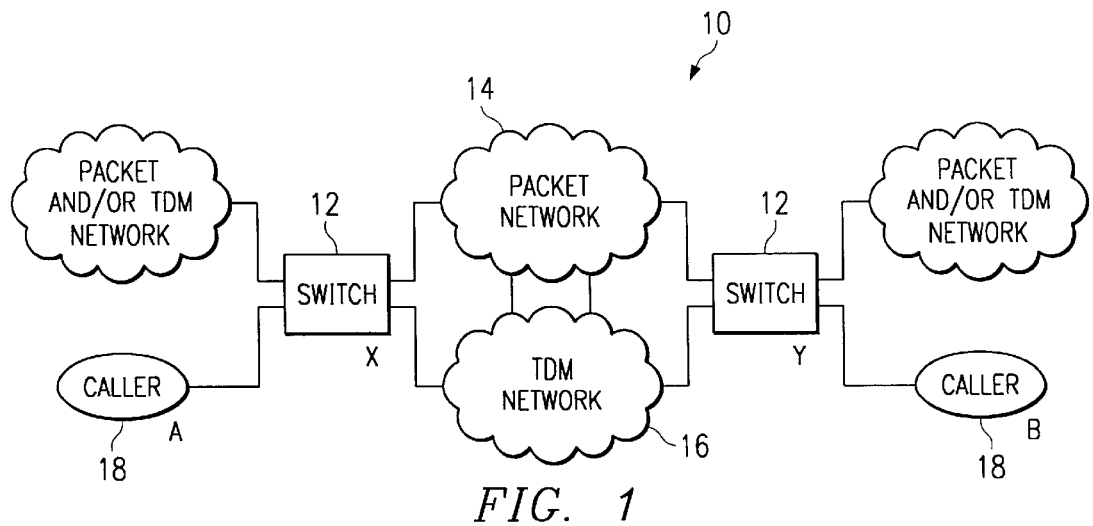
FIG. 1 is a block diagram illustrating a telephony system for controlling communication sessions in accordance with the teachings of the present invention.

FIG. 1 illustrates a telephony system 10 that includes hybrid switches 12 coupled to packet networks 14, TDM networks 16, and callers 18. In general, system 10 establishes communication sessions between callers 18 by connecting switches 12 using packet network 14 and TDM network 16, and switches the communication sessions between these networks.

Packet network 14 represents any collection and arrangement of hardware and/or software allowing packet-based communications between hybrid switches 12. For example, packet network 14 may be one or a collection of components associated with the public switched telephone network (PSTN), local area networks (LANs), wide area networks (WANs), a global computer network such as the Internet, or other suitable wireline or wireless communications technology that supports communication of data in packets. The term "packet" refers to any fixed or variable size grouping of data. Packet network 14 may use any one or combination of suitable packet-based transmission protocols, such as internet protocol (IP), asynchronous transfer mode (ATM), X.25, transmission control protocol (TCP), user datagram protocol (UDP), and internetwork packet exchange/sequenced packet exchange (IPX/SPX). In general, transmission protocols may be any standard procedure for regulating transmissions between two devices and are not limited to packet or TDM protocols.

TDM network 16 represents any collection and arrangement of hardware and/or software allowing TDM-based communications between hybrid switches 12. For example, TDM network 16 may be one or a collection of components associated with the PSTN, LANs, WANs, or other suitable wireline or wireless communications technology. TDM network 16 may communicate information using any suitable transmission protocol for TDM signals. As mentioned, both packet network 14 and TDM network 16 may contain any number of telephony devices, including hybrid switches 12. Telephony devices may be any hardware and/or software capable of linking to telephony system 10, such as, switches, routers, telephones, computers, media gateways, mixed environment gateways, call centers, modems, cell phones, and wireless phones.

Caller 18 represents communications and/or processing equipment used or maintained by any user of telephony system 10. For example, caller 18 may be a telephone, an IP telephone, a computer equipped with a modem, a switch, another hybrid switch 12, or any other telephony device suitable for connecting to telephony system 10. Throughout this description, caller 18 refers to communications and/or processing equipment or the user of this equipment, as appropriate. And while this example shows a simplified block diagram, telephony system 10 contemplates callers 18 and hybrid switches 12 connected at any point to packet network 14 and TDM network 16, and multiple switches to switch connections between callers 18.

Hybrid switch 12 represents any collection and arrangement of hardware and/or software that establishes physical or virtual circuits, completes or breaks an electrical path, or selects paths or circuits. Moreover, hybrid switch 12 represents any mixed environment gateway (MEG) that connects and disconnects users of at least two telephony networks, such as packet networks 14 and TDM networks 16. In general, hybrid switch 12 is coupled to callers 18 using subscriber links and to other network devices, such as other hybrid switches 12, using network links.

In operation, hybrid switches 12 establish a communication session between callers 18 using packet network 14 or TDM network 16. Based on certain conditions, hybrid switches 12 may switch the communication session from packet network 14 to TDM network 16 or from TDM network 16 to packet network 14. This switchover between networks may be accomplished between any two hybrid switches 12 along the path between callers 18 or through the combined actions of multiple hybrid switches 12 along the path. A communication session may be any connection between at least two devices for communicating information using telephony system 10. For example, a telephone call, a data connection, a voice connection, a video connection, or other connection between at least two devices coupled to telephony system 10.

In a particular example, caller 18 labeled A (caller A) places a telephone call to caller 18 labeled B (caller B). Hybrid switch 12 labeled X (switch X) receives this connection request and establishes a connection with hybrid switch 12 labeled Y (switch Y) using packet network 14. Switch Y rings caller B, and if caller B goes off-hook or otherwise indicates acceptance of the call, switch X and switch Y establish a communication session between caller A and caller B using packet network 14. If either switch detects a degradation in the quality of the communication session, switch X and switch Y migrate, transfer, or switch the communication session from packet network 14 to TDM network 16 without terminating the telephone call between caller A and caller B. Alternatively, the communication session could be originated using TDM network 16 and then switched to packet network 14. And while these examples are very particularized, telephony system 10 contemplates establishing a communication session between two hybrid switches 12 using a network communicating using any transmission protocol and then switching this communication session to a second network between switches 12 communicating using a different transmission protocol during the progress of the communication session.

Figure 2:
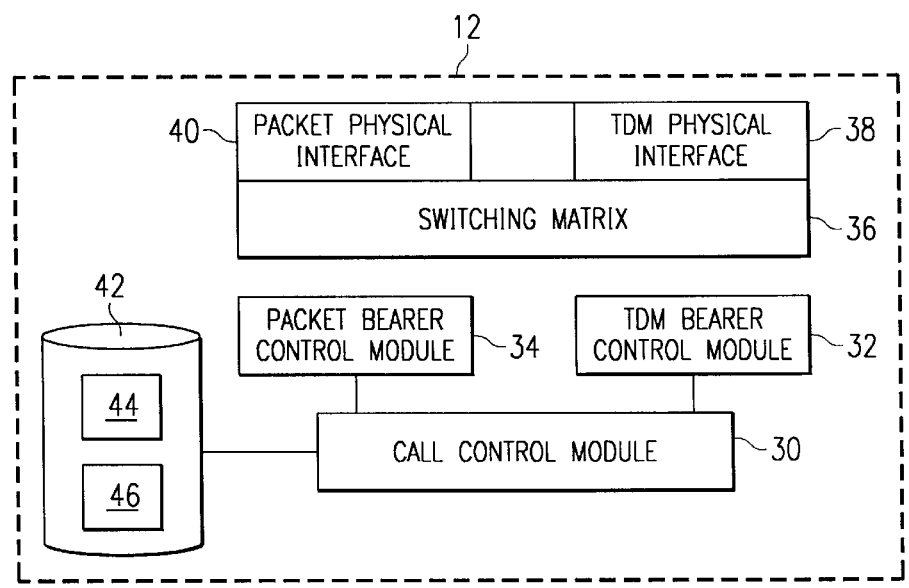
FIG. 2 illustrates an exemplary hybrid switch from the system of FIG. 1.

FIG. 2 illustrates hybrid switch 12 that includes a call control module 30 coupled to a TDM bearer control module 32, a packet bearer control module 34, and a memory 42. Hybrid switch 12 also includes a switching matrix 36 coupled to a TDM interface 38 and a packet interface 40. In addition, switching matrix 36 may be coupled to callers 18 using TDM interface, packet interface, or other suitable interface. TDM interface 38 and packet interface 40, each represent any suitable communications hardware and/or software for interfacing with local and/or remote devices using any suitable transmission protocol. Memory 42 represents any one or combination of volatile or non-volatile, local or remote devices suitable for storing data, for example, random access memory (RAM) devices, read only memory (ROM) devices, magnetic storage devices, optical storage devices, or other suitable data storage device.

In operation, TDM interface 38 provides connectivity between hybrid switch 12, TDM network 16, and callers 18 using TDM-based transmission protocols. Packet interface 40 provides connectivity between hybrid switch 12, packet network 14, and callers 18 using packet-based transmission protocols. In addition, TDM interface 38 and packet interface 40 may translate signals into a format suitable for switching matrix 36. In general, hybrid switch 12 establishes connections with other telephony devices using packet interface 40 and TDM interface 38 and then routes communications between these connections using switching matrix 36. For example, hybrid switch 12 establishes connections with two attached telephones using TDM interface 38 and then connects a telephone call between them using switching matrix 36.

Call control module 30 monitors and controls the operation of components within hybrid switch 12, and monitors and controls connections between hybrid switch 12 and other devices, such as other hybrid switches 12. In addition, call control module 30 establishes links using TDM bearer control module 32 and Packet bearer control module 34. TDM bearer control module 32 monitors and controls the operation of TDM interface 38 and switching matrix 36 based on communications with call control module 30. Packet bearer control module 34 monitors and controls the operation of packet interface 40 and switching matrix 36 based on communications with call control module 30.

Hybrid switch 12 establishes links using switching matrix 36 to connect devices coupled to hybrid switch 12 and establish communication sessions. Switching matrix 36 establishes links by, for example, establishing a physical connection, establishing a virtual or software connection, switching timeslots, routing packets, or other suitable techniques for routing communications between multiple telephony devices coupled to hybrid switch 12. The functionality hybrid switch 12 and its modules may be accomplished using any suitable hardware, software, or combination of hardware and software.

In operation, call control module 30 establishes communication sessions using TDM bearer control module 32 and packet bearer control module 34 to control switching matrix 36, and maintains a session information table 44 stored in memory 42. Session information table 44 identifies the communication session and stores information describing the characteristics of the communication session. In addition, control module 32 may access and/or maintain a caller profile table 44 stored in memory 42 to determine information describing participants in the communication session and/or users requesting service.

In a particular embodiment, hybrid switch 12 establishes a communication session with a remote telephony device using packet network 14 and monitors the communication session, maintaining information from this monitoring in session information table 44. If the quality of the communication session deteriorates, call control module 30 determines whether the remote telephony device is also coupled to TDM network 16. Thus call control module determines whether the remote telephony device is another hybrid switch 12 coupled to both packet network 14 and TDM network 16. Call control module 30 may then switch the communication session from packet network 14 to TDM network 16. Alternatively, hybrid switch 12 may establish the communication session using TDM network 16 to communicate with the remote telephony device, and then switch the communication session from TDM network 16 to packet network 14.

In addition, system 10 contemplates initiating a communication session on a network using any transmission protocol and switching that communication session to a different network using a different transmission protocol in response to any suitable circumstances. This switchover may be accomplished using any technique that allows the communication session to continue unabated. For example, the communication session may be transferred from one path to the other, or hybrid switches may establish a new path on the alternate network and then migrate the communication session to the new path. After the switchover has been accomplished, connections remaining over the old path may be disconnected.

Moreover, telephony system 10 may switch a communication session based on an acute or a chronic problem, packet loss measurements, packet delay measurements, bit error rate measurements, signal-to-noise ratios, user requests, cost determinations, or other suitable conditions. Furthermore, suitable conditions may differ according to the participants in the communication session, the transmission protocol, the availability of resources, information contained in caller profile table 46, or other characteristics of the communication session or telephony system 10.

FIG. 3 shows an example of session information table 44 containing session information 50 organized by rows, each row representing a communication session indexed by a call identifier. For each communication session, session information table 44 contains information describing the current transmission protocol, specifying route type and voice encoding algorithm in two columns. In addition, session information table 44 contains status information detailing the performance of the communication session with quality metrics, such as the acute packet loss percentage (for example, percentage of packets lost in the last ten seconds), the chronic packet loss percentage (for example, percentage of packets lost over the duration of the call), and bit error rate.

Session information table 44 also contains quality thresholds established for each communication session. These thresholds may be established using any suitable technique or algorithm, and may be determined based on information from caller profile table 46. For example, user-friendly scales used in caller profile table 46 may be converted using appropriate algorithms into numbers suitable for comparison against quality metrics of the communication session. These thresholds may be populated dynamically at the inception of a communication session and/or may be modified during the communication session.

In the example for session information table 44 in FIG. 3, both acute and chronic packet losses and bit error rates are tracked using session information table 44. Thus the re-route thresholds column contains three thresholds, one for each measurement maintained. Also, certain measurements are only valid for certain transmission protocols. For example, packet delay is not a valid measurement for a communication session using TDM network 16. Therefore, session information table 44 maintains only fields appropriate for the current transmission protocol for each communication session. While this example shows only limited information, telephony system 10 contemplates session information table 44 containing any number and combination of fields describing connections between hybrid switch 12 and other devices or between telephony devices couple to hybrid switch 12. Moreover, system 10 contemplates storing session information 50 using any suitable method or format.

FIG. 4 is an example of caller profile table 46 maintained in memory 42. Caller profile table 46 contains caller profiles 60 organized by rows, each row associated with a particular caller identified by a caller identifier. Caller profile table 46 may contain any number and combination of fields storing information relating to caller 18, for example, user preferences, information describing caller 18, previous selections of caller 18, or other suitable descriptive information. Using these selections, system 10 may apply appropriate algorithms for determining quality thresholds and routing algorithms based on connection criteria. These algorithms account for factors affecting the communication session, such as the availability of alternate networks, the current transmission protocol, and other appropriate considerations.

In this example, caller profile table 46 contains fields for caller 18 to designate a minimum packet network quality as well as to designate the importance of the cost of the communication session. Packet network quality and importance of cost are rated on a one to ten scale, ten being the highest quality and rating cost as very important. An algorithm may weight the criteria based on the characteristics of the communication session and telephony system 10 to develop switching guidelines. For example, for caller 18 requesting minimum packet network quality and rating cost as very important, communication sessions on packet network 14 will be permitted to deteriorate to a much lower quality than for caller 18 requesting an excellent minimum packet network quality and rating cost with minimal importance. System 10 contemplates any number and combination of user selectable criteria to affect the guidelines for switching individual communication sessions between networks, such as quality thresholds and routing preferences. These criteria may reflect user-friendly values requiring conversion or may be actual threshold values applied by system 10. Moreover, these criteria affect only automatic switches between networks, and caller 18 may request a switch for any reason during the communication session and override the selections in caller profile table 46.

Figure 5:
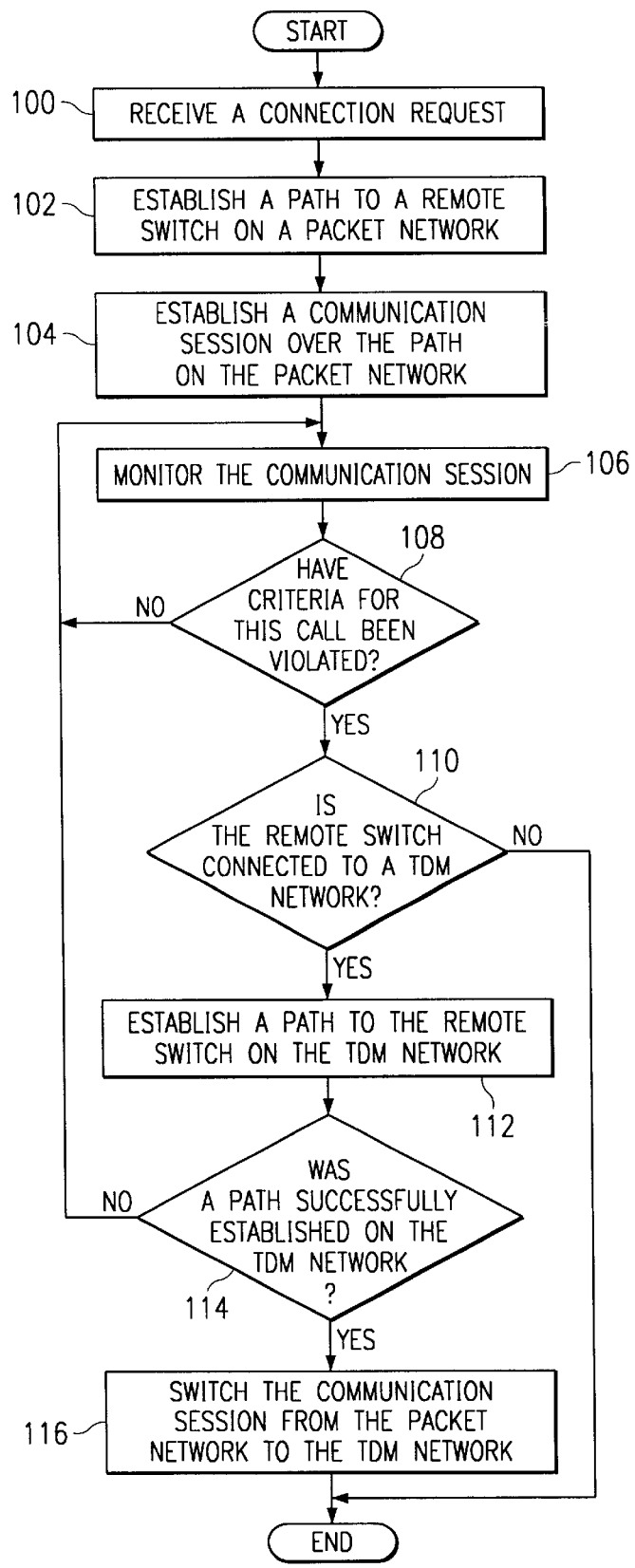
FIG. 5 is a flowchart of a method for switching a communication session between two telephony networks.

FIG. 5 is a flowchart illustrating a method for controlling a telephony communication session. Hybrid switch 12 receives a connection request at step 100, and establishes a path to a remote switch using packet network 14 at step 102. Hybrid switch 12 establishes a communication session using packet network 14 at step 104, and monitors the communication session at step 106. Hybrid switch 12 may monitor status of the communication session, such as the quality of the transmissions, the cost of the current connection, the potential cost of alternate connections, requests from participants, or other suitable tracking information.

Hybrid switch 12 determines whether quality of service (QoS), cost, or other criteria for this call have been violated at step 108. If not, hybrid switch 12 resumes monitoring of the communication session at step 106. If any criteria have been violated, hybrid switch 12 attempts to switch the communication session to another available network. In a particular embodiment, hybrid switch 12 may determine any change of circumstances that indicates a need to switch the communication session to an alternate network. For example, at the request of a participant in the communication session, if a similar quality lower cost path is available, or other appropriate circumstances. A participant may request a switchover using any appropriate signaling, such as a dual tone multi-frequency (DTMF) signal or a flashhook signal. In addition, other devices in telephony system 10 may monitor the communication session and/or request or determine that a switch to an alternate network should be performed. For example, caller 18 or remote hybrid switch 12 may detect a degradation in the quality of the communication session and request a switch.

Hybrid switch 12 determines whether the remote switch is connected to TDM network 16 at step 110. If not, no switching can take place. However, if the remote switch is connected to TDM network 16, hybrid switch 12 determines if resources on TDM network 16 are available, and, if so, establishes a path to the remote switch using TDM network 16 at step 112. Hybrid switch 12 determines whether a path was successfully established using TDM network 16 at step 114. If not, hybrid switch 12 resumes monitoring of the communication session at step 106. However, if the path was successfully established, hybrid switch 12 switches the communication session from packet network 14 to TDM network 16 at step 116. This may be performed using a call transfer feature where hybrid switch 12 initiates the transfer requests, confirms successful transfer of the call to TDM network 16, and tears down the original packet-based call. System 10 contemplates any suitable signaling and cooperation among hybrid switches 12 to coordinate the call switchover. One significant advantage of system 10 is that the switchover to another communication network can occur without disrupting or terminating the communication session, and, in certain circumstances, in a manner undetectable to participants in the communication session.

Although this flowchart establishes the communication session using packet network 14 and then switches to TDM network 16, system 10 contemplates establishing a communication session on a network using any transmission protocol and then switching the communication session to an alternate network using a different transmission protocol.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A hybrid telephony switch, comprising:

a first interface coupled to a first network;

a second interface coupled to a second network; and a controller operable to:

establish a communication session with a remote location through the first interface; and switch the communication session from the first interface to the second interface without disrupting the communication session;

wherein the controller is further operable to:

access a user profile associated with a participant in the communication session, wherein the user profile includes a cost criterion and a quality criterion;

determine a switching threshold based on the cost criterion and the quality criterion;

monitor first performance criteria of the first interface;

monitor second performance criteria of the second interface; and switch the communication session from the first interface to the second interface based on the switching threshold, the first performance criteria, and the second performance criteria.

2. The switch of claim 1, wherein the first network communicates information using a packet-based protocol, and the second network communicates information using a TDM-based protocol.

3. The switch of claim 1, wherein the controller is further operable to switch the communication session from the first interface to the second interface responsive to a request of a participant in the communication session.

4. The switch of claim 1, wherein the controller is further operable to establish the communication session responsive to a user placing a telephone call.

5. The switch of claim 1, wherein the communication session comprises a telephone call and the controller is further operable to switch the communication session from the first interface to the second interface without disrupting voice communications between participants of the telephone call.

6. The switch of claim 1, wherein the controller is further operable to switch the communication session from the first interface to the second interface by initiating a call transfer request to transfer the communication session from the first interface to the second interface.

7. The switch of claim 1, wherein the controller is further operable to switch the communication session from the first interface to the second interface based on a routing preference determined from a profile associated with a participant in the communication session.

8. The switch of claim 1, wherein the first performance criteria and the second performance criteria each comprise cost determinations and quality metrics.

9. A method for controlling a telephony communication session, comprising:

establishing a telephony communication session with a remote device on a first network communicating information using a first transmission protocol;

switching the communication session from the first network to a second network communicating information using a second transmission protocol without disrupting the communication session;

accessing a user profile associated with a participant in the communication session, wherein the user profile includes a cost criterion and a quality criterion;

determining a switching threshold based on the cost criterion and the quality criterion;

monitoring first performance criteria of the first network;

monitoring second performance criteria of the second network; and switching the communication session from the first network to the second network based on the switching threshold, the first performance criteria, and the second performance criteria.

10. The method of claim 9, wherein the first transmission protocol is a packet-based protocol, and the second transmission protocol is a TDM-based protocol.

11. The method of claim 9, further comprising switching the communication session from the first network to the second network responsive to a request of a participant in the communication session.

12. The method of claim 9, further comprising establishing the communication session responsive to a telephone call.

13. The method of claim 9, further comprising switching the communication session from the first network to the second network by initiating a call transfer request to transfer the communication session from the first network to the second network.

14. The method of claim 9, further comprising switching the communication session from the first network to the second network based on a routing preference determined from a profile associated with a participant in the communication session.

15. The method of claim 9, wherein the first performance criteria and the second performance criteria each comprise cost projections and quality metrics.

16. A computer program stored on a computer readable medium, the program operable to:

establish a first connection with a remote location on a first network, wherein the first network communicates information using a first transmission protocol;

establish a telephony communication session on the first connection;

establish a second connection with the remote location on a second network, wherein the second network communicates information using a second transmission protocol;

switch the communication session from the first connection to the second connection without disrupting the communication session;

access a user profile associated with a participant in the communication session, wherein the user profile includes a cost criterion and a quality criterion;

determine a switching threshold based on the cost criterion and the quality criterion;

monitor first performance criteria of the first network;

monitor second performance criteria of the second network; and switch the communication session from the first network to the second network based on the switching threshold, the first performance criteria, and the second performance criteria.

17. The computer program of claim 16, wherein the first transmission protocol is a packet-based protocol, and the second transmission protocol is a TDM-based protocol.

18. The computer program of claim 16, further operable to switch the communication session from the first connection to the second connection responsive to a request of a participant in the communication session.

19. The computer program of claim 16, further operable to switch the communication session from the first connection to the second connection by initiating a call transfer request to transfer the communication session from the first connection to the second connection.

20. The computer program of claim 16, further operable to switch the communication session from the first connection to the second connection based on a routing preference determined from a profile associated with a participant in the communication session.

21. The computer program of claim 16, wherein the first performance criteria and the second performance criteria each comprise cost projections and quality metrics.

22. A hybrid telephony switch, comprising:

a first interface coupled to a first network;

a second interface coupled to a second network; and a controller operable to:

establish a communication session with a remote location through the first interface; and switch the communication session from the first interface to the second interface without disrupting the communication session;

wherein the controller is further operable to:

monitor a chronic quality degradation of the communication session and an acute quality degradation of the communication session;

compare the chronic quality degradation to a chronic quality threshold;

compare the acute quality degradation to an acute quality threshold;

switch the communication session from the first interface to the second interface if the chronic quality degradation exceeds the chronic quality threshold; and switch the communication session from the first interface to the second interface if the acute quality degradation exceeds the acute quality threshold.

23. A method for controlling a telephony communication session, comprising:

establishing a telephony communication session with a remote device on a first network communicating information using a first transmission protocol;

switching the communication session from the first network to a second network communicating information using a second transmission protocol without disrupting the communication session;

monitoring a chronic quality degradation of the communication session and an acute quality degradation of the communication session;

comparing the chronic quality degradation to a chronic quality threshold;

comparing the acute quality degradation to an acute quality threshold;

switching the communication session from the first network to the second network if the chronic quality degradation exceeds the chronic quality threshold; and switching the communication session from the first network to the second network if the acute quality degradation exceeds the acute quality threshold.

24. A computer program stored on a computer readable medium, the program operable to:

establish a first connection with a remote location on a first network, wherein the first network communicates information using a first transmission protocol;

establish a telephony communication session on the first connection;

establish a second connection with the remote location on a second network, wherein the second network communicates information using a second transmission protocol;

switch the communication session from the first connection to the second connection without disrupting the communication session;

monitor a chronic quality degradation of the communication session and an acute quality degradation of the communication session;

compare the chronic quality degradation to a chronic quality threshold;

compare the acute quality degradation to an acute quality threshold;

switch the communication session from the first connection to the second connection if the chronic quality degradation exceeds the chronic quality threshold; and switch the communication session from the first connection to the second connection if the acute quality degradation exceeds the acute quality threshold.

* * * * *